April 17, 1928.
W. H. BAUERT
1,666,364
FOOT MAT AND LUGGAGE AND LIKE CARRIER DEVICE FOR MOTOR ROAD VEHICLES
Filed June 30, 1924
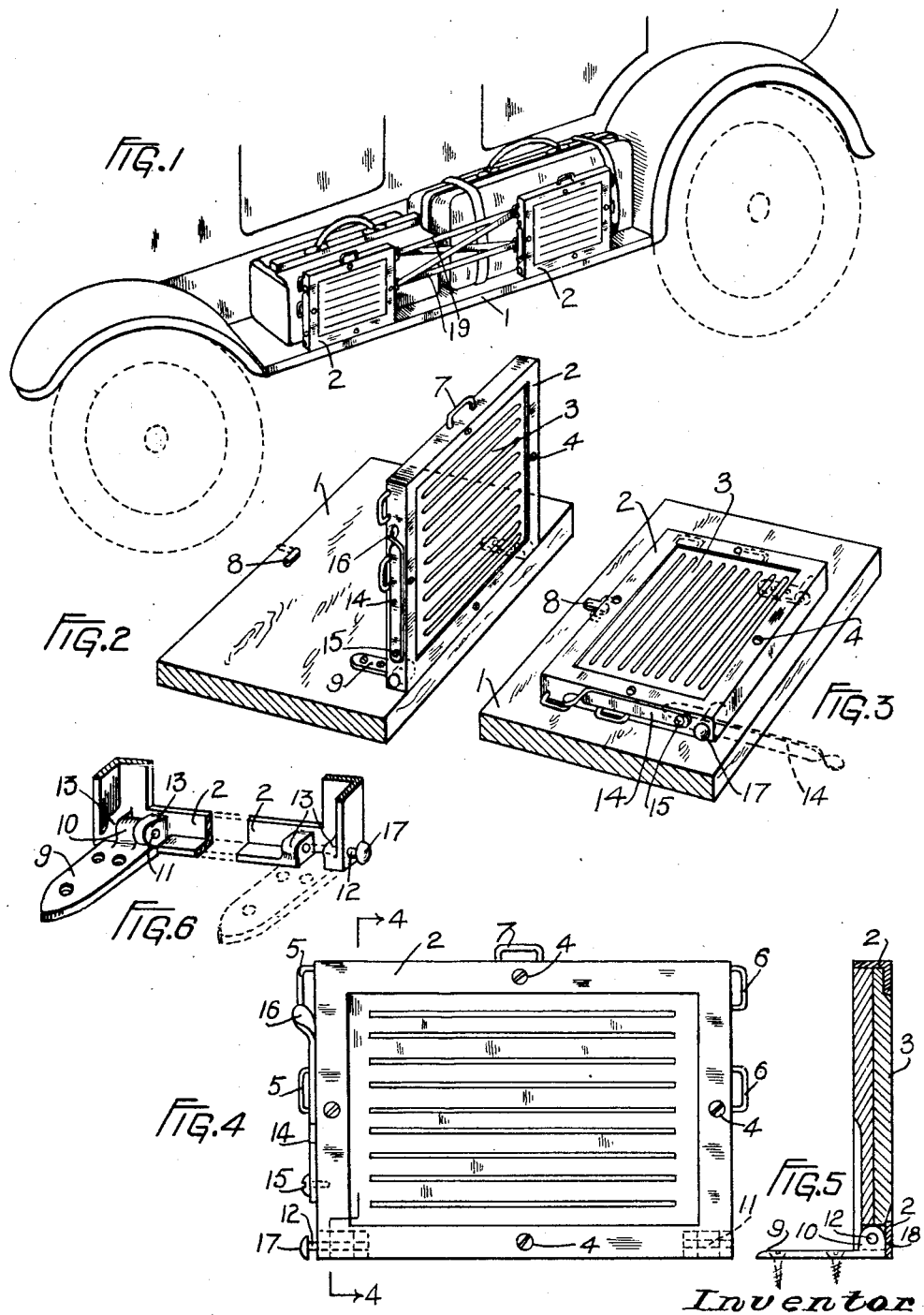
Inventor
W. H. Bauert
By Marks Clark
Attys.

Patented Apr. 17, 1928.

1,666,364

UNITED STATES PATENT OFFICE.

WILLIAM HENRY BAUERT, OF ROSEVILLE, NEAR SYDNEY, NEW SOUTH WALES, AUSTRALIA.

FOOT MAT AND LUGGAGE AND LIKE CARRIER DEVICE FOR MOTOR ROAD VEHICLES.

Application filed June 30, 1924, Serial No. 723,358, and in Australia July 24, 1923.

This invention relates to a foot mat and carrier for luggage, parcels, packages, bags and other articles usable on the running boards of motor road vehicles, and has for its object to provide a device which when set in one position on the running board of the vehicle is adaptable as a foot mat whilst when the device is set in another position on the running board it is adaptable as a luggage or like carrier. Optionally a boot scraper may be combined with the foot mat carrier.

Referring to the accompanying drawings, Fig. 1 is a perspective view of a pair of the foot mat carrier devices attached to the running board of a motor road vehicle; Fig. 2 a broken perspective view of one of the devices shown upstanding on a motor vehicle running board; Fig. 3 a view showing the device illustrated in Fig. 2 folded on the running board Fig. 4 a plan view of the foot mat-carrier; Fig. 5 a section on line 4—4 Fig. 4; and Fig. 6 a detail view of hinging means.

To the running board 1 of a motor road vehicle is suitably hinged one or more metal frames 2 of any approved construction carrying a rubber or other appropriate foot mat 3. Such mat may be secured to the frame 2 by countersunk screws 4 or otherwise.

It is preferred though not essential to provide the frame 2 with lugs 5 and 6 at the ends thereof and with another lug 7 at one side thereof. The lugs 5 and 6 may be substituted by suitable openings made in the frame 2 through which a fastening strap or the like may be threaded. If the lug 7 is provided it may be utilized in association with a turn button 8 or the like for holding the frame 2 to the running board 1 when the said frame is in downturned position on the running board 1 as shown in Fig. 3.

The hinges which are furnished for securing one side of the frames 2 to the running board 1 are such as to enable the foot mat-carrier frames 2 to be folded to the running board 1 or to be upturned therefrom at an angle of say 90° as shown in Fig. 2. Said hinges may be constructed as shown in Figs. 5 and 6; in such construction the plates 9 of the hinges have an integral lug 10 with an eye therein to receive the pintle pins 11 and 12 which fit lugs 13 on the frame 2. The plates 9 are adapted to be screwed or otherwise secured to the running board 1, and the lugs 10 may be constructed with a plane face 18 to serve as an abutment for the hinge against the frame 2 to prevent the latter being turned from the running board 1 beyond say 90°.

Though not essential the foot-mat-carrier frame 2 may have associated therewith a boot or like scraper 14. Said scraper may be pivoted to one end of the frame 2 by means of a screw 15 or the like. When required the scraper 14 may be turned into the position shown in dotted lines in Fig. 3 in which position it is utilizable as a boot or like scraper, or it may be folded to the end of the frame 2 when not required as a scraper as shown in full lines in Figs. 2, 3 and 4. Preferably the scraper 14 consists of a small bar of metal having one end thereof twisted to form a finger grip 16. If the scraper 14 is furnished it is preferred to extend the pintle pin 12 beyond one side of the frame and to form such pin with a head 17, the shank of such pin serving as a stop and support for the scraper 14 when it is in outturned position from the frame 2 and the head 17 also serving as a guide and side support for the scraper in such position.

The scraper 14 may also be utilized as a lever for effecting initial upward movement of the mat as when raising the same to upright position. The lever may be used to advantage in this way when the mat, due to the accumulation of mud and dirt or ice is caused to adhere to the running board of the vehicle.

One foot-mat carrier or two or more thereof may be fitted to the running board 1. Two such carriers are shown in Fig. 1. The plates 9 of the hinges are secured to the outward end of the upper face of the running board so that if the device is to be used for a foot mat it may be made to lie on the running board as shown in Fig. 3, but if required for use as a carrier it may be upturned to the position shown in Figs. 1 and 2.

In operation, the frame or frames 2 having been hinged to the running board 1, they may be folded to such board when the device is to be utilized as a foot mat or mats. If, however, the device is to be used as a luggage or other carrier, the frame or frames 2 are turned to upstanding position as described on the running board 1 and bags, parcels, or other articles to be carried may be situated on the board 1 behind the said frame or frames, and if necessary straps 19 (Fig. 1) or the like may be attached as required to the lugs 5, 6, and 7 or otherwise and also to the articles whereby the latter may be held securely and safely on the running board 1.

What I claim as my invention and desire to secure by Letters Patent is:—

A mat and luggage carrier including a frame, means for hingedly securing said frame with the running board of a vehicle, said means including a laterally projecting pivot pin, a lever pivoted to said frame and normally occupying a position folded against the latter, said lever being movable to a position engaging the laterally projecting pivot pin.

In testimony whereof I have signed my name to this specification.

WILLIAM HENRY BAUERT.